Patented July 16, 1935

2,008,095

UNITED STATES PATENT OFFICE 2,008,095

THERAPEUTIC SUBSTANCE AND PROCESS OF MANUFACTURE

Faw Yap Chuck, San Francisco, Calif.

No Drawing. Application July 19, 1932, Serial No. 623,393

6 Claims. (Cl. 167—53)

This invention relates generally to therapeutic preparations and to methods of compounding the same. The preparation is particularly useful in the control of a certain avian disease commonly termed "coccidiosis".

Coccidiosis is a fairly common disease which attacks fowls like chickens and turkeys, and animals like the rabbit. It is caused by the invasion of the intestinal tract by an organic parasite known as *Eimera avian*. These parasitic germs multiply at the expense of the cells of the epithelium of the intestinal walls, and in some cases the destruction of the tissues causes severe hemorrhage. There are six species of the coccidia known to affect chickens, two affect turkeys, quails and pheasants, and one and possibly two affect rabbits. Each species of coccidia has a favorite area of the intestines to thrive. Hemorrhage and toxic substances given off by the germs usually cause high mortality in chickens, turkeys, pheasants, quails and rabbits.

Up to the present, the only treatment for this disease meeting with any degree of success, has been the feeding of a mash containing 40% of dry skim or buttermilk. Chemicals and drugs such as bismuth subnitrate, zinc sulphocarbolate, potassium bichromate, ipecca, hydrochloric acid and the like have been tried and found inadequate in controlling the disease. Where the infection is in the caeca, milk mash feeding is adequate, particularly where the mash contains 20% of lactose by including 40% of dry milk containing 50% lactose, because such a feed serves as a marked laxative. The laxative action causes voiding of the caeca content more often than normal, thus bringing about rapid elimination of coccidia from the caeca. This washing effect together with the highly digestible nutrients furnished by the milk along with the increase of acidity in the caeca, enables the fowl to combat the disease successfully. Occasionally however the coccidia eliminated in the droppings reinfect the fowl as fast as it can pass them out. The result is an uncontrollable case.

When the coccidia infection is located in the upper and lower parts of the small intestine, where the coccidia *E. acervulina* and *E. mitis* for instance thrive best, treatment by milk mash or any other laxative material has no beneficial effect. Chickens so infected when fed with milk mash will brighten for a short time, but will again become unhealthy soon after stopping the milk mash feeding. Continuous feeding of 40% milk mash tends to produce weak and soft intestinal tracts, and will not eliminate coccidia infection in the small intestine. Considering that the feeding of milk mash can control coccidiosis in the caeca and that only one out of six known species of coccidia affect the caeca in the case of the chicken, the milk mash treatment is far from being satisfactory.

It is an object of my invention to provide a coccidiosis remedy which will kill the invading parasitic germs internally without injuring the tissues of the patient. My remedy is characterized by the fact that it can be administered to fowl or animals infected with any one or combination of all six species of coccidia that affect the chicken, that is *E. acervulina, E. mitis, E. maxima, E. tenella, E. praecox and E. necatrix*, and will kill the coccidia internally without any ill effects upon the fowl. The same result has been obtained with the remedy in coccidiosis cases caused by *E. meliagridis* and *E. meliagrimitis* in turkeys; *E. dispersa* in quail and *E. phasiani* in pheasants.

It is a further object of the invention to provide a practical commercial method of manufacturing my remedy.

My remedy consists generally of a suitable toxic alkaloid, like nicotine, nicotinic acid or quinolinic acid, compounded with protein material. More specifically I have discovered that such toxic ingredients, which can be termed pyridine or quinoline derivatives, when compounded with protein material like albumin, have a powerful destructive action upon all known forms of coccidia organisms, but will not attack the tissue of the intestines and will not detrimentally affect the system. Proven results have been secured by the use of nicotine as the main toxic ingredient, although I have found that in order to facilitate formation of a stable compound between the nicotine and protein, it is desirable to employ tannic acid, and in order to increase the effectiveness of the remedy in destroying undesired organisms and at the same time to minimize toxicity of the nicotine compound upon the fowl or other animal to which it is administered, it is desirable to iodize the nicotine.

In one specific embodiment of my invention, my preparation consists of di-iodo-nicotine-tannate or tetra-iodo-nicotine-tannate, in combination with albumin. The effects of such nicotine compounds on coccidia organisms has been shown by placing a specimen of the organism, either the oocyst or the sporulated cyst, on a microscopic slide and putting a solution of such nicotine compounds on the side of the cover slip, allowing the solution to diffuse thru the slide. As soon as the iodo-nicotine solution comes in contact with the coccidia organism, the outer coating of the organism begins to crack and the nucleus swells and eventually burst.

In treating infected chickens, the chickens are fed a grain mash containing suitable amounts of my preparation. A complete cure is generally effected in about four days. An overdosage of the remedy appears to have no detrimental effects, and likewise it has been found that no harm is occasioned by continuing feeding of the mash after the chickens have been cured. Not only does treatment with my remedy cause disappearance of recognizable coccidia organism in the infected intestinal regions, but it likewise causes disappearance of hemorrhagic areas in the intestinal and caeccal walls. Somewhat greater effectiveness can be obtained by simultaneously administering a suitable laxative.

I have further found that a mixture of iodo-glycinin, glycinin-tannate and nicotine glycinin, is effective as a substitute for iodo-nicotine-tannates, in combination with albumin. These compounds taken separately have been found to act very slowly on coccidia organism, but when the three are compounded together, the resulting material has a rapid destructive action on the germs. The mixture produced from the three organic compounds is not purely mechanical, but certain amounts of iodo-nicotine-tannate-glycinin, are formed in the mixture.

The following is an outline of a practical process for the manufacture of di-iodo-nicotine-tannate-glycinin. 50 lbs. of soy bean (which is a source of glycinin) are soaked in water for 10 hours and then ground into a thick liquid milk. This is then filtered to remove coarse particles and fibrous material. The homogeneous filtrate is then heated to 195 deg. F. and divided into two equal portions.

To one portion of the soy bean milk add a solution of 25 lbs. iodine in 30 lbs. 95% alcohol, while the milk is being constantly stirred. At this time glycinin, which constitutes about 85 to 90% of the protein content of the soy bean milk, combines with part of the iodine; the starch in the milk combines with another part of the iodine and the rest of the iodine is absorbed throughout the brown colloidal precipitate which is being formed in the process.

To the other portion of the soy bean milk there is added 38 lbs. of tannic acid (95% pure). The tannic acid is added gradually and the milk continually stirred. A yellow precipitate of glycinin tannate is formed. About 17 lbs. of 95% pure nicotine are then added with continuous stirring. A dark viscous mass of nicotine-glycinin-tannate, is formed.

The iodine protein compound with absorbed iodine made from the first portion of the soy bean milk, is now mixed with the nicotine compound made from the second portion of the milk, at about 100° F. A final product of di-iodo-nicotine-glycinin-tannate, is thus formed. This brownish black precipitate, being a colloid, has no clearcut physical characteristics. However the pure di-iodo-nicotine-tannate can be isolated, as a distinct chemical compound forming definite needle crystals of Monoclinic form, which are reddish brown in color, having a melting point of 185° C.

Tetra-iodo-nicotine-tannate-glycinin, which has the same effect as di-iodo-nicotine-tannate-glycinin, can be manufactured by the same process outlined above, except that twice the amount of iodine is employed.

The above iodo-nicotine compounds are made more palatable by mixing the same with material like molasses. For example the batch of di-iodo-nicotine-tannate-glycinin, obtained by the above outlined process, can be mixed with 80 lbs. of molasses. To facilitate mixing this material more evenly thru chicken feed, it can be rendered more bulky by mixing with 100 lbs. of ground wheat. 10 lbs. of this final mixture with 90 lbs. of a chicken mash, will give 0.05 lbs. of iodo-nicotine-glycinin-tannate per lb. of mash. This dosage has been demonstrated to be adequate in controlling coccidiosis caused by any one or combination of all known species of coccidia, in chickens of all ages.

While my preparation has been developed primarily as a remedy for coccidiosis, it can be used with success for the destruction of certain other intestinal parasites. For example, when applied in larger doses, it has been found effective to destroy the more common varieties of worms in fowl and other animals. In administering my preparation for this purpose, a dosage should include a suitable laxative, to properly clear the intestinal tract. One advantage of my remedy when used as a cure for worms, is that it may be administered without a reduction in normal feed, and will not detrimentally affect the health and egg productivity of the chickens.

I claim:

1. A therapeutic preparation for the destruction of intestinal parasites comprising di-iodo-nicotine-tannate-glycinin.

2. A therapeutic preparation for the destruction of intestinal parasites, comprising tetra-iodo-nicotine-tannate-glycinin.

3. A process of manufacturing a therapeutic remedy comprising, adding tannic acid and nicotine to a protein to form a precipitate of nicotine glycinin tannate, iodizing another batch of protein to form a precipitate, and then intermixing the two precipitates.

4. A process of manufacturing a preparation of the character described, comprising forming a reaction product between iodine, tannic acid and protein, and then causing the reacation product to further react with a material formed by reacting nicotine with a protein.

5. A preparation for the destruction of intestinal parasites, comprising an iodo-alkaloid-tannate-protein.

6. A preparation useful for the destruction of intestinal parasites, comprising an iodo-nicotine-tannate-protein.

FAW YAP CHUCK.